United States Patent [19]

Friedman

[11] 4,159,795

[45] Jul. 3, 1979

[54] TELESCOPING WIRE DISPENSER

[76] Inventor: Louis Friedman, 62 Cardinal Dr., East Hills, N.Y. 11576

[21] Appl. No.: 869,591

[22] Filed: Jan. 16, 1978

[51] Int. Cl.² ........................................... B65H 49/04
[52] U.S. Cl. .................................. 226/127; 242/137.1
[58] Field of Search ..................................... 242/137.1; 226/127–133; 206/389, 404, 405, 406; 219/144, 137.2, 139, 85 R; 228/41

[56] References Cited

U.S. PATENT DOCUMENTS

| | | | |
|---|---|---|---|
| 2,514,542 | 7/1950 | Guest | 206/389 |
| 2,809,748 | 10/1957 | Barnaby | 206/389 |
| 2,848,969 | 8/1958 | Shapiro | 226/128 |
| 3,250,453 | 5/1966 | Halstead | 226/127 X |
| 3,896,982 | 7/1975 | Redman | 226/128 |
| 3,999,697 | 12/1976 | Hill, Jr. | 226/128 |

*Primary Examiner*—David A. Scherbel
*Attorney, Agent, or Firm*—Hopgood, Calimafde, Kalil, Blaustein & Lieberman

[57] ABSTRACT

Apparatus for dispensing wire comprises a first elongate cylindrical tube having an aperture at one end thereof and a blocking wall at the opposite end thereof. A second elongate cylindrical tube is positioned within said first tube, said second tube having upper and lower apertures at each end thereof. A length of flexible wire is coiled to a diameter greater than the outer circumference of the second tube and within the inner circumference of the first tube and one portion of the wire is extended from the lower aperture of the second tube and through the upper aperture of the second tube. The second tube extends through the aperture in the top portion of the first tube thereby allowing the second tube, and the wire contained therein, to be extended outwardly from the first tube aperture and accurately positioned adjacent to a work area. In accordance with a further embodiment of the invention a third elongate cylindrical tube may be positioned between the second tube and the length of coiled wire. A refillable dispensing cartridge can also be positioned within the first tube to facilitate the dispensing of flexible wire. The outer wall of the refillable dispensing cartridge can also be the first tube.

16 Claims, 13 Drawing Figures

TELESCOPING WIRE DISPENSER

FIELD OF THE INVENTION

This invention relates to wire dispensers and, more particularly, to a wire dispenser, which facilitates the precise placement of the dispensed wire.

DESCRIPTION OF THE PRIOR ART

Various types of wire dispensers are known in the art. One type of wire dispenser which is commonly used is illustrated by U.S. Pat. No. 2,809,748 granted to R. E. Barnaby on Oct. 15, 1957. The Barnaby dispenser consists of a pair of coaxial tubes, fitted one within the other, wherein a supply of solder or other wire is wound around the smaller tube and contained within the toroidal space between the tubes. The free end of the solder is passed through the inner tube and extended from an upper aperture of the inner tube for dispensing. Required amounts of solder are withdrawn from the dispenser by simply exerting sufficient force on the free end of the solder to pull the solder from the dispenser.

The Barnaby dispenser, as well as similar types of wire dispensers, have several inherent disadvantages. One disadvantage is the fact that it is very difficult to position the dispenser near the work area due to the bulk and thickness of the dispenser. Therefore in order to reach the work area it is necessary to extend a considerable length of wire from the dispenser. Due to the flexibility of the wire, the extension of the wire from the dispenser makes it extremely difficult to maintain the wire in the correct position at the point of application. An additional disadvantage is the fact that many prior art dispensers are capable of only dispensing one grade or type of wire at a time when simultaneous dispensing of several types of wire is very desirable in many soldering applications.

It is, therefore, an object of this invention to provide apparatus for accurately positioning flexible wire adjacent to a work area.

It is another object of this invention to provide apparatus for accurately positioning flexible wire within hard-to-reach or crowded work areas.

It is a further object of this invention to provide for the simultaneous dispensing of two or more grades of wire.

It is another object of this invention to provide a dispenser that is refillable with wire or braid.

It is a further and general object of this invention to provide apparatus capable of simultaneously dispensing several types of wire or solder and also capable of accurately positioning one end of the wire in a relatively inaccessible work area.

SUMMARY OF THE INVENTION

In accordance with the invention apparatus for dispensing wire comprises a first elongate cylindrical tube having an aperture at one end thereof and a blocking wall at the opposite end thereof. A second elongate cylindrical tube is positioned within said first tube, said second tube having upper and lower apertures at each end thereof. A length of flexible wire is coiled to a diameter greater than the outer circumference of the second tube and within the inner circumference of the first tube and one portion of the wire is extended from the lower aperture of the second tube and through the upper aperture of the second tube.

It is a feature of the invention that the second tube extends through an aperture in the top portion of the first tube thereby allowing the second tube, and the wire contained therein, to be extended outwardly from the first tube aperture.

It is another feature of the invention that a third elongate cylindrical tube may be positioned between the second tube and the length of coiled wire.

It is a further feature of the invention that the second tube includes flange members integrally formed on the lower end thereof for engaging the sidewalls of the first tube aperture when the second tube is fully extended from the first tube.

It is a further feature of the invention that an additional length of wire can be coiled to a diameter greater than the outer circumference of the first tube thereby allowing the simultaneous dispensing of two types of wire.

It is a still further feature of the invention that a refillable dispensing cartridge can be positioned within the first tube to provide for the dispensing of flexible wire. The outer wall of the refillable dispensing cartridge can also be the first tube.

The foregoing and other objects and features of this invention will be more fully understood from the following description of an illustrative embodiment thereof taken in conjunction with the accompanying drawings.

DETAILED DESCRIPTION

Figure 1A:
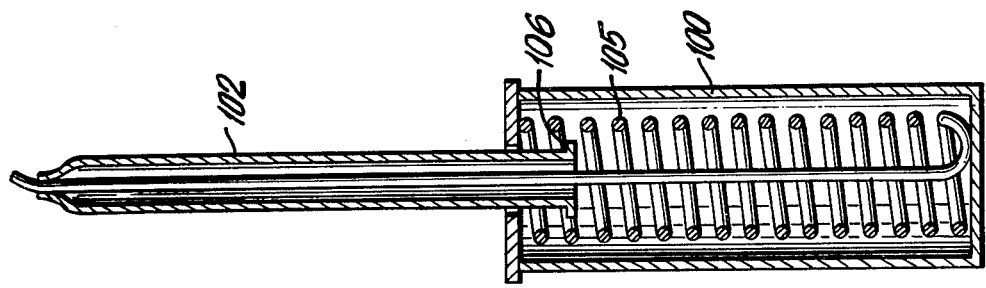
FIGS. 1A and 1B illustrate the telescoping wire dispenser of the instant invention wherein dispensing is accomplished via three concentric elongate tubes.

Refer to FIG. 1A wherein is illustrated one embodiment of the wire dispenser of the instant invention. The wire dispenser consists of an elongate tube 100 which is sealed with a blocking wall 108 at one end thereof and which has a cap 104 at the other end thereof, cap 104 having an upper aperture 110. Contained within tube 100 is an additional elongate cylindrical tube 101 which is of a lesser diameter than tube 100. An additional tube 102 is positioned within tube 101 and the upper end of tube 102 extends through aperture 110 in the cap of tube 100. A coil of wire or solder 105 is coiled to a diameter greater than the outer circumference of tube 101 and contained within the inner circumference of tube 100. One portion of the wire is extended from a lower aperture 107 of tube 102, through the tube, and through a tapered upper aperture 103 of tube 102.

It is readily appreciated that the configuration shown in FIG. 1A provides for the dispensing of the wire coiled to a diameter greater than the outer circumference of tube 101. Applying a lateral force to the wire will withdraw the wire through tube 102 so that the wire can be applied to a work area. Selection of the dimensions of each of the three tubes shown in FIG. 1A as well as selection of the dimensions of the upper aperture of tube 102 determines the amount of friction encountered when attempting to withdraw the wire from the wire dispenser. A proper selection of the dimensions will ensure that there is sufficient drag on the wire so that smooth and even dispensing is provided while at the same time preventing the wire from being forced back into the dispenser when the wire is applied to the work area.

Figure 1B:
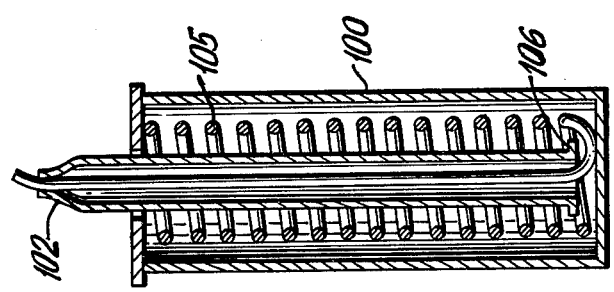

FIG. 1B illustrates one of the advantages inherent in the instant invention. More particularly, it is seen that tube 102, and the wire contained therein, can be extended or telescoped outwardly from the aperture of tube 100. Extending the wire outwardly from the wire dispenser in this manner allows the wire or solder to be positioned quite near the work area without the necessity of positioning the complete dispenser near the work area. More importantly, adequate support is provided for the flexible wire by tube 102 and tapered aperture 103 such that the wire can be accurately positioned at the point of application. It is appreciated that when tube 102 is extended so as to position the wire at the work area, the end of the tube may be subjected to high temperatures such as would be present in a soldering operation. For this reason tube 102 is preferably made of a heat-resistant material such that the end of the wire and the end of tube 102 can be placed immediately adjacent to the work area without any danger of damage to the telescoping tube. Integrally formed at the lower end of tube 102 are flange members 106. These flange members are designed to engage the upper aperture of tube 101 when tube 102 is in an extended position. In this manner tube 102 can be fully extended without any possibility that tube 102 will be inadvertently removed from the body of the wire dispenser.

Figure 2A:
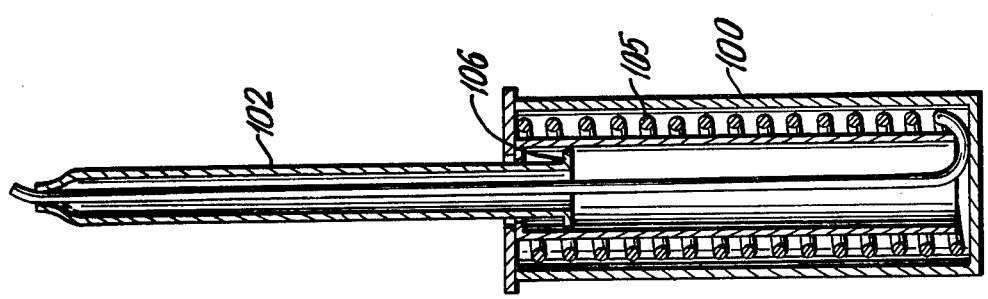
FIGS. 2A and 2B illustrate the wire dispenser of the instant invention utilizing two concentric tubes.
Figure 2B:
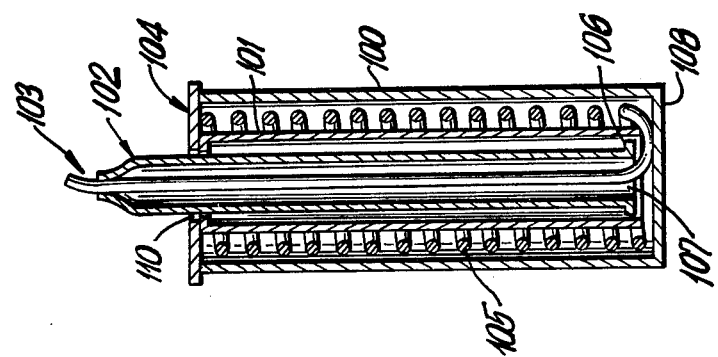

Refer to FIGS. 2A and 2B wherein a second embodiment of the instant invention is shown. In this embodiment of the invention, tube 101 is not utilized and the wire to be dispensed is coiled to a diameter greater than the outer diameter of tube 102 and within the inner diameter of tube 100. FIG. 2B illustrates tube 102 in an extended position thereby providing the advantages discussed above, i.e., the ability to accurately position the wire in difficult or crowded work areas. It is appreciated that in this embodiment, wire 105 must be of sufficient stiffness such that the wire will remain coiled about tube 102 and will not interfere with the extension of tube 102 from the upper aperture of tube 100. Alternatively, of course, the wire coil can be made smaller in length than the body of tube 100, thereby allowing the wire coil to ride up and down in conjunction with the telescoping action of tube 102. Flange members 106 formed on the lower end of tube 102 prevent the tube from being completely withdrawn from tube 100 when the inner tube is in an extended position.

Figure 3A:
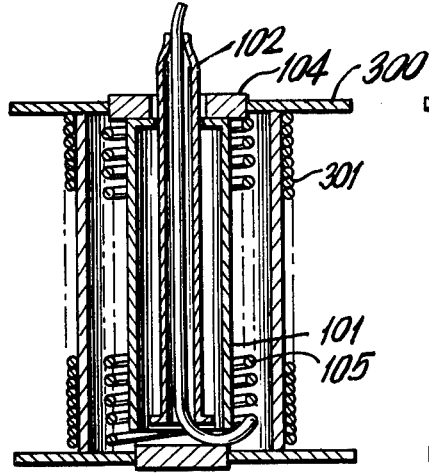
FIGS. 3A and 3B illustrate the wire dispenser of the instant invention utilized for simultaneously dispensing two types of wire.
Figure 3B:
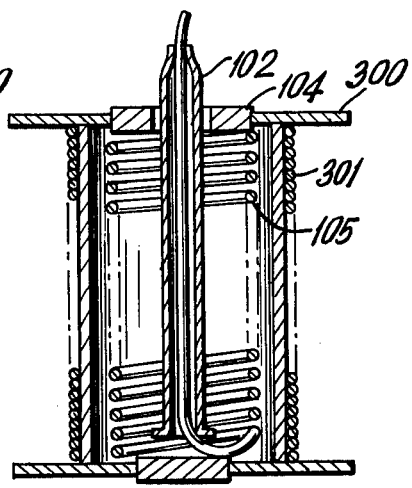

FIGS. 3A and 3B illustrate another embodiment of the invention adapted for the simultaneous dispensing of more than one type or grade of wire. More particularly, cylinder 300 can be a typical solder spool used for dispensing solder wherein the solder is coiled about the outer circumference of the spool as is shown at 301. Positioned within the inner circumference of the solder spool are tubes 101 and 102 as have been described above. Coiled to a diameter greater than the outer circumference of tube 101 is wire 105 and this wire is withdrawn through the upper aperture of 102 as has been previously described. Therefore, it can be seen that the configuration shown in FIGS. 3A and 3B can provide for the dispensing of solder from the outer circumference of the solder spool while at the same time providing for the dispensing of desoldering braid (also known as solder wick) from tube 102. Alternatively, of course, this embodiment can be used for dispensing two grades of solder or wire. FIG. 3B is an illustration of the embodiment of the invention just described in which tube 101 is not utilized and tube 102 is positioned directly within the inner circumference of the solder spool.

Figure 4:
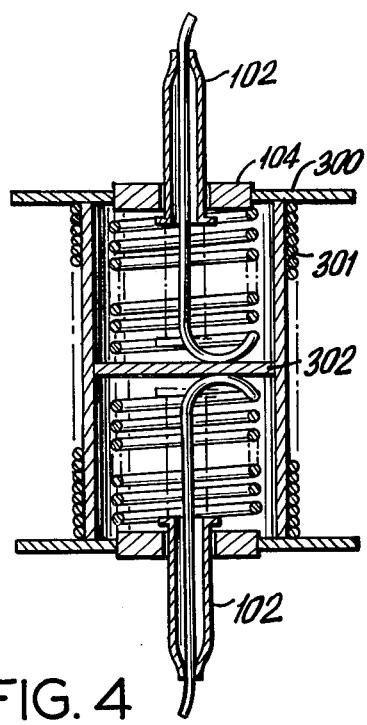
FIG. 4 illustrates one embodiment for dispensing three types of wire.

FIG. 4 illustrates another embodiment of the invention providing for the simultaneous dispensing of three grades of wire or solder. As is illustrated therein, a first tube 102 is positioned through an upper end of the solder spool while a second tube is positioned through a lower end of the solder spool with blocking wall 302 extending between the two tubes. Various grades of solder wick and/or solder are coiled around the outer circumference of tubes 102 and can be withdrawn therefrom in the manner described above. In addition, the solder spool contains an additional grade of solder and/or a different type of wire 301, thereby providing for the dispensing of three types of wire simultaneously.

Figure 5:
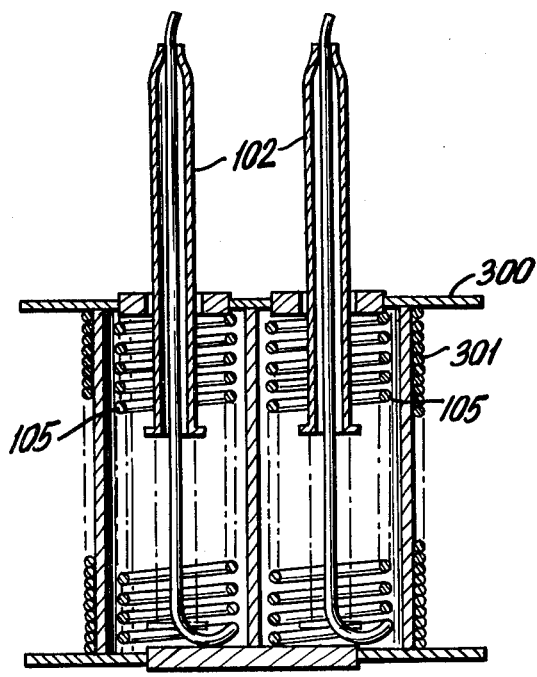
FIG. 5 illustrates a second embodiment for dispensing three types of wire.

FIG. 5 illustrates a further embodiment of the invention also providing for the simultaneous dispensing of three types of wire. As is illustrated therein tubes 102 are positioned side by side within a large diameter solder spool with a blocking wall provided between the two tubes. It is appreciated that the embodiments shown in FIGS. 4 and 5 can be utilized with or without tube 101 in the manner described above.

Figure 6A:
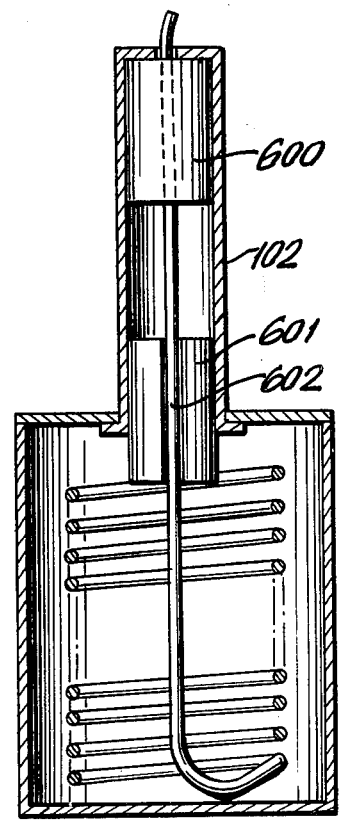
FIGS. 6A, 6B and 6C illustrate the utilization of an insert for facilitating the dispensing of various grades of wire.
Figure 6B:
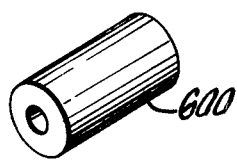
Figure 6C:
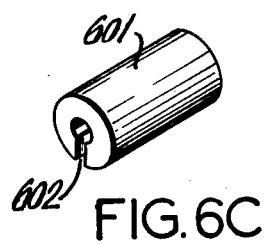

FIGS. 6A, 6B and 6C illustrate an additional embodiment of the invention providing for the dispensing of various grades of wire through tube 102. More particularly, it may be desirable to use the same center tube for different sizes of solder or solder wick. An insert with the correct diameter opening is added to the inner tube as is shown at 600 and 601 to provide support for the various sizes of wire. This insert may be of latex, polyethelene or similar material. Two versions are shown in FIGS. 6B and 6C with FIG. 6B illustrating a standard insert and FIG. 6C illustrating an insert having a slit 602 in the insert such that the insert may be placed within the tube after the solder or wick have already been placed in the dispenser.

Figure 7A:
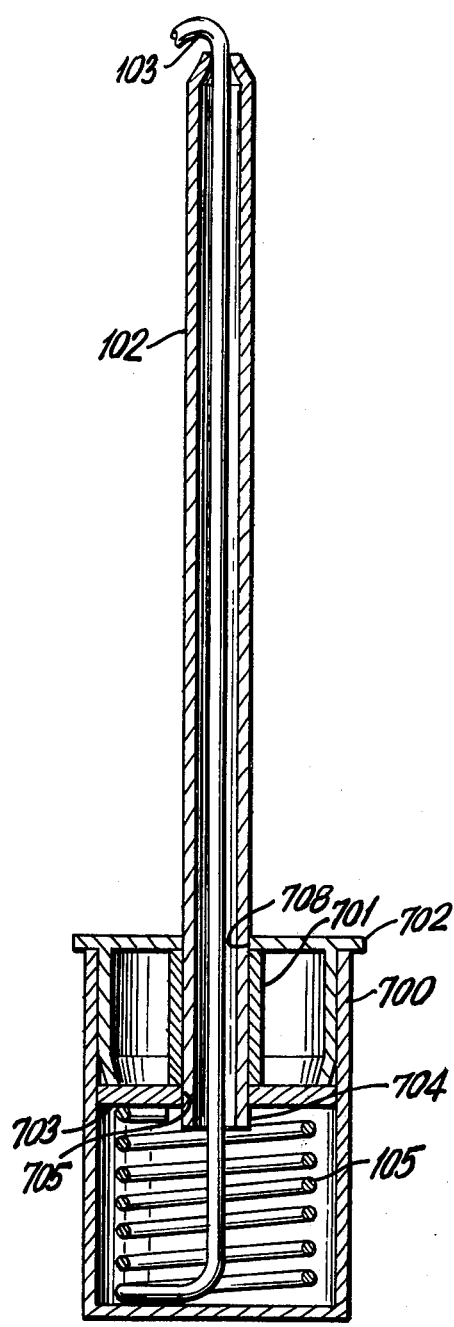
FIGS. 7A and 7B illustrate a refillable dispensing cartridge for use with the instant invention.
Figure 7B:
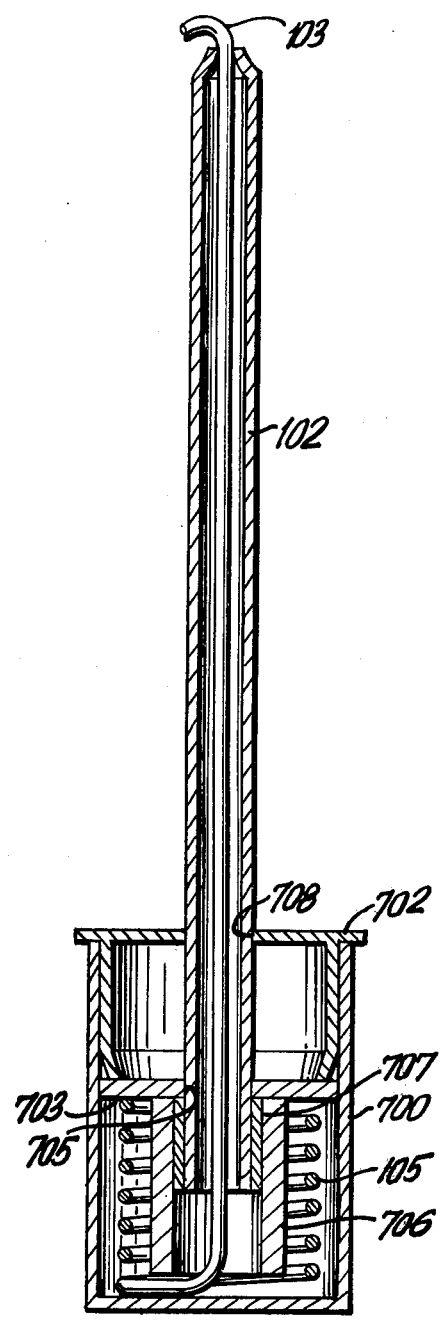

FIGS. 7A and 7B illustrate a further embodiment of the invention which provides for a refillable dispensing cartridge to be contained within tube 100. Dispensing cartridge 700 is a hollow cylinder having sealing wall 703 positioned within the interior of the cylinder. Flexible wire 105 is contained within cylinder 700 in the portion of the cylinder which is beneath sealing wall 703. Storing wire 105 within the dispenser in this way allows the wire to be tightly packed within the cylinder such that it is not displaced during transportation of the wire dispenser.

In the embodiment in FIG. 7A tube 102 includes cylindrical sleeve 701 fixedly attached to a lower portion of tube 102. Sealing wall 703 has an aperture 705 through which the lower portion (704) of tube 102 is placed. The dispenser is sealed with cap 702 which restrains tube 102 within the cylinder by pressing sleeve 701 against the sealing wall as illustrated in FIG. 7A.

Cap 702 has an aperture (708) therein through which tube 102 extends. The wire contained within the dispenser is extended through tube 102 in the same manner as was described above.

Dispenser 700 can be placed within tube 100 and properly sized such that the dispenser is able to move vertically within the inner circumference of tube 100. Tube 102 extends through cap 104 and thus tube 102 can be moved outwardly from tube 100 as the dispensing cartridge moves vertically within tube 100.

FIG. 7B is an alternate embodiment of the dispensing cartridge. In this embodiment hollow tube 706 is rigidly attached to the sealing wall and tube 102 is designed to vertically move within tube 706. The wire contained within the dispensing cartridge is wound to a diameter greater than the outer circumference of tube 706 and one portion of the wire is extended through tube 102. In this embodiment cartridge 700 can be designed to fit within tube 100 without providing for vertical movement and thus the telescoping action of the instant invention is provided in this embodiment by the vertical movement of tube 102 within tube 706. The outer circumferential wall of cartridge 700 can also be tube 100.

The foregoing, therefore, has demonstrated a wire dispenser which provides many advantages over prior art dispensers. More particularly, the invention described herein provides for the dispensing of multiple types or grades of wire or solder from one container. This feature is very advantageous in soldering operations as both solder wick and solder of the proper type and grade can be dispensed from the same container and moreover it is not necessary to use a number of dispensers for one soldering operation. In addition, the dispenser allows for the wire or solder to be guided directly to the work area, provides efficient operation in crowded or hard to reach areas, facilitates the even and smooth dispensing of the wire, and prevents back-up of the wire into the dispenser base when the wire is applied to the work area. A further advantage of this invention when used with desoldering wick is that the effective surface area for desoldering can be markedly increased by pressing the heat resistant probe against the work and pushing the wick back toward the probe, thereby spreading the individual wires forming the wick braid. The spreading of the wires increases the effective desoldering area many fold, thereby increasing the amount of solder which may be removed. As part of this procedure, the wick braid may be made to conform directly with the shape of the area to be desoldered, thereby further improving its desoldering action. A still further advantage of the invention is that a refillable dispensing cartridge can also be positioned within the first tube to facilitate the dispensing of flexible wire.

Although several embodiments of this invention have been shown, and described, it will be understood that various modifications may be made without departing from the spirit of this invention.

What is claimed is:

1. Apparatus for dispensing wire comprising a first elongate cylindrical tube having an aperture at one end thereof, and a blocking wall at the opposite end thereof, a second elongate cylindrical tube positioned within said first tube and having a first aperture at the upper end thereof, and a second aperture at the lower end thereof, said upper end of said second tube extending through the first tube aperture, and a length of flexible wire coiled outside the outer circumference of said second tube and within the inner circumference of said first tube, one portion of said wire extending through said second tube from said second aperture thereof to said first aperture thereof, whereby said second tube and the wire portion contained therein can be extended outwardly from said first tube aperture.

2. Apparatus in accordance with claim 1, wherein a third elongate cylindrical tube is concentrically positioned between said second tube and said length of coiled wire, whereby the wire is coiled outside the outer circumference of said third tube and said second tube is contained within the inner circumference of said third tube.

3. Apparatus in accordance with claim 2, wherein said second tube has flange members integrally formed on the lower end thereof for engaging the sidewalls of said first tube aperture at the time said second tube is fully extended from said first tube.

4. Apparatus in accordance with claim 3, wherein said first tube has an additional length of flexible wire coiled around the outer circumference thereof.

5. Apparatus in accordance with claim 1, wherein said blocking wall has an aperture formed therein, the blocking wall aperture being arranged to accommodate an additional elongate cylindrical tube having flexible wire coiled about the outer circumference thereof, one portion of the wire extending through the additional tube from a lower aperture thereof to an upper aperture thereof, said additional tube extending outwardly in the opposite direction from said second tube.

6. Apparatus in accordance with claim 1, wherein said first tube has two aperture formed at the upper end thereof, and a pair of second tubes extending outwardly from the two apertures.

7. Apparatus in accordance with claim 1, wherein an elongate cylindrical insert is positioned within the inner circumference of the second tube, said insert having a reduced diameter aperture formed therethrough, whereby the wire contained within the second tube is supported by said insert.

8. Apparatus for dispensing wire comprising a first elongate cylindrical tube having an aperture at one end thereof and a blocking wall at the opposite end thereof, a second elongate cylindrical tube positioned within said first tube and having a first aperture at the lower end thereof, said upper end of said second tube extending through the first tube aperture, a third elongate cylindrical tube concentrically positioned between said second tube and said first tube, a length of flexible wire coiled outside the outer circumference of said third tube and within the inner circumference of said first tube, one portion of the wire extending through the second tube from said second aperture thereof to said first aperture thereof, whereby the second tube and the wire portion contained therein can be extended outwardly from said first tube aperture.

9. Apparatus in accordance with claim 8, wherein said first tube has an additional length of wire coiled around the outer circumference thereof.

10. Apparatus for dispensing wire comprising a first elongate cylindrical tube having a first aperture at one end thereof and a second aperture at the opposite end thereof, a pair of second elongate cylindrical tubes positioned within said first tube, each having a first aperture at the upper end thereof and a second aperture at the lower end thereof, said upper ends of said pair of second tubes extending through the first and second apertures respectively of said first tube, and first and second lengths of flexible wire coiled respectively outside the outer circumference of each of said second tubes and within the inner circumference of said first tube, one portion of the first wire extending through one of the second tubes from said second aperture thereof to said first aperture thereof and one portion of the second wire extending through the other of the second tubes from said second aperture thereof to said first aperture thereof, whereby the second tubes and the wire portions contained therein can be extended outwardly in opposite directions from said first tube apertures.

11. Apparatus in accordance with claim 10, wherein said first tube has an additional length of wire coiled around the outer circumference thereof.

12. Apparatus in accordance with claim 11, wherein an elongate cylindrical insert is positioned within the inner circumference of the second tubes, said insert having a reduced diameter aperture formed therethrough, whereby the wire contained within the second tubes is supported by said insert.

13. Apparatus for dispensing wire comprising a first elongate cylindrical tube having an aperture at one end thereof and a blocking wall at the opposite end thereof, a cylindrical dispensing cartridge contained within said first cylindrical tube and adapted for the storage of flexible wire, said dispensing cartridge including a blocking wall at one end thereof, an apertured cap at the other end thereof, and a second elongate cylindrical tube, having an aperture at upper and lower ends thereof, and extending from within the dispensing cartridge and through said apertured cap, an upper end of the second tube extending through the first tube aperture and one portion of the flexible wire extending from within the dispensing cartridge, and through the second tube, whereby said second tube and the wire portion contained therein can be extended outwardly from said first tube aperture.

14. Apparatus in accordance with claim 13, wherein said flexible wire is restrained within said dispensing cartridge with an apertured sealing wall, a lower portion of said second tube extending through an aperture in said sealing wall.

15. Apparatus in accordance with claim 14, wherein said dispensing cartridge further includes a third elongate cylindrical tube, positioned within said dispensing cartridge and having the flexible wire coiled around the outer circumference thereof.

16. Apparatus in accordance with claim 13, wherein the circumferential outer wall of said dispensing cartridge is said first cylindrical tube.

* * * * *